(12) United States Patent
Chou

(10) Patent No.: US 7,707,686 B2
(45) Date of Patent: May 4, 2010

(54) TRUCKLE ASSEMBLY

(75) Inventor: Chuan-Hai Chou, Sanchong (TW)

(73) Assignee: Haion Caster Industrial Co., Ltd., Taipei County (TW)

( * ) Notice: Subject to any disclaimer, the term of this patent is extended or adjusted under 35 U.S.C. 154(b) by 138 days.

(21) Appl. No.: 11/979,762

(22) Filed: Nov. 8, 2007

(65) Prior Publication Data

US 2009/0119878 A1 May 14, 2009

(51) Int. Cl.
*B60B 33/00* (2006.01)
(52) U.S. Cl. ...................................... 16/35 R
(58) Field of Classification Search ............... 16/35 R, 16/37, 38; 248/346.11; 188/19, 20, 30, 31, 188/2 F, 68, 69
See application file for complete search history.

(56) References Cited

U.S. PATENT DOCUMENTS

| | | | | |
|---|---|---|---|---|
| 1,475,257 A * | 11/1923 | Bottone | ...................... | 403/321 |
| 3,881,216 A * | 5/1975 | Fontana | ...................... | 16/35 R |
| 4,035,864 A * | 7/1977 | Schroder | ...................... | 16/35 R |
| 4,669,580 A * | 6/1987 | Neville | ...................... | 188/1.12 |
| 4,832,546 A * | 5/1989 | Potemkin | ...................... | 409/234 |
| 5,913,634 A * | 6/1999 | Heilig | ...................... | 403/374.1 |
| 5,988,323 A * | 11/1999 | Chu | ...................... | 188/1.12 |
| 6,360,851 B1 * | 3/2002 | Yang | ...................... | 188/1.12 |
| 6,532,624 B1 * | 3/2003 | Yang | ...................... | 16/35 R |
| 6,810,560 B1 * | 11/2004 | Tsai | ...................... | 16/35 R |
| 2002/0069478 A1* | 6/2002 | Trivini | ...................... | 16/35 R |
| 2009/0113671 A1* | 5/2009 | Chu | ...................... | 16/35 R |

* cited by examiner

*Primary Examiner*—Victor Batson
*Assistant Examiner*—Michael Lee
(74) *Attorney, Agent, or Firm*—Muncy, Geissler, Olds & Lowe, PLLC

(57) ABSTRACT

A truckle assembly has a housing, a rotating unit movably mounted on the housing, a limiting unit and a wheel assembly. The housing includes a body and a sleeve. A slope portion is formed inside the body and neighboring the sleeve. The rotating unit includes a central shaft, and a gear ring mounted on the central shaft for corresponding to a first side of the slope portion. The limiting unit includes a pedal, an interferential portion linking an end of the pedal, and an arresting portion linking an end of the interferential portion. The pedal has a first portion extending into the housing, and a second portion extending out of the housing. The interferential portion corresponds to a second side of the slope portion. The wheel assembly includes at least a wheel assembled on sides of the housing, and a shaft pole extending through the wheels and the pedal.

9 Claims, 4 Drawing Sheets

TRUCKLE ASSEMBLY

BACKGROUND OF THE INVENTION a) Field of the Invention

The present invention relates to a truckle assembly, and in particular to a truckle assembly capable of limiting movement and rotation simultaneously.

b) Description of the Prior Art

A conventional truckle assembly typically comprises a housing and a wheel pivoted to the housing. An arresting member is provided between the housing and the wheel for pressing against a metal plate on the wheel. An axis pole is mounted on an end of the housing. In use, the truckle wheel is mounted on a bottom of an object which wants to move. The object is brought to move when the truckle assembly moves. The axis pole rotates to make the wheel be able to move in multiple directions. As the object arrives at a desired position, the arresting member presses the wheel to stop the truckle assembly.

In prior art, the wheel is pressed to stop movement of the truckle assembly. However, rotation direction of the wheel is not limited. Correspondingly, when the truckle assembly is arrested, the axis pole can still change rotation direction thereof. The movement and rotation direction of the truckle assembly can not be effectively limited at a time, and therefore can not meet practical demand.

SUMMARY OF THE INVENTION

Accordingly, to overcome the above deficiency, an object of the present invention is to provide a truckle assembly which simultaneously limits movement and rotation.

The truckle assembly of the present invention comprises a housing, a rotating unit, a limiting unit and a wheel assembly. The housing includes a body, and a sleeve on an end of the body and communicating with interior of the body. A through hole is defined through opposite sides of the body. A slope portion is formed inside the body and neighboring the sleeve. The rotating unit is movably mounted on the sleeve of the housing, and includes a central shaft, and a gear ring mounted on the central shaft for corresponding to a first side of the slope portion. The limiting unit includes a pedal, an interferential portion linking an end of the pedal, and an arresting portion linking an end of the interferential portion. The pedal has a first portion extending into the housing, and a second portion extending out of the housing. The interferential portion corresponds to a second side of the slope portion. The arresting portion has two sides respectively extending out of the through hole of the housing. The wheel assembly includes at least a wheel assembled on sides of the housing, and a shaft pole extending through the wheels and the pedal. Each wheel forms a toothed portion adjacent the housing for corresponding to the arresting portion.

DETAILED DESCRIPTION OF THE PREFERRED EMBODIMENTS

Figure 1:
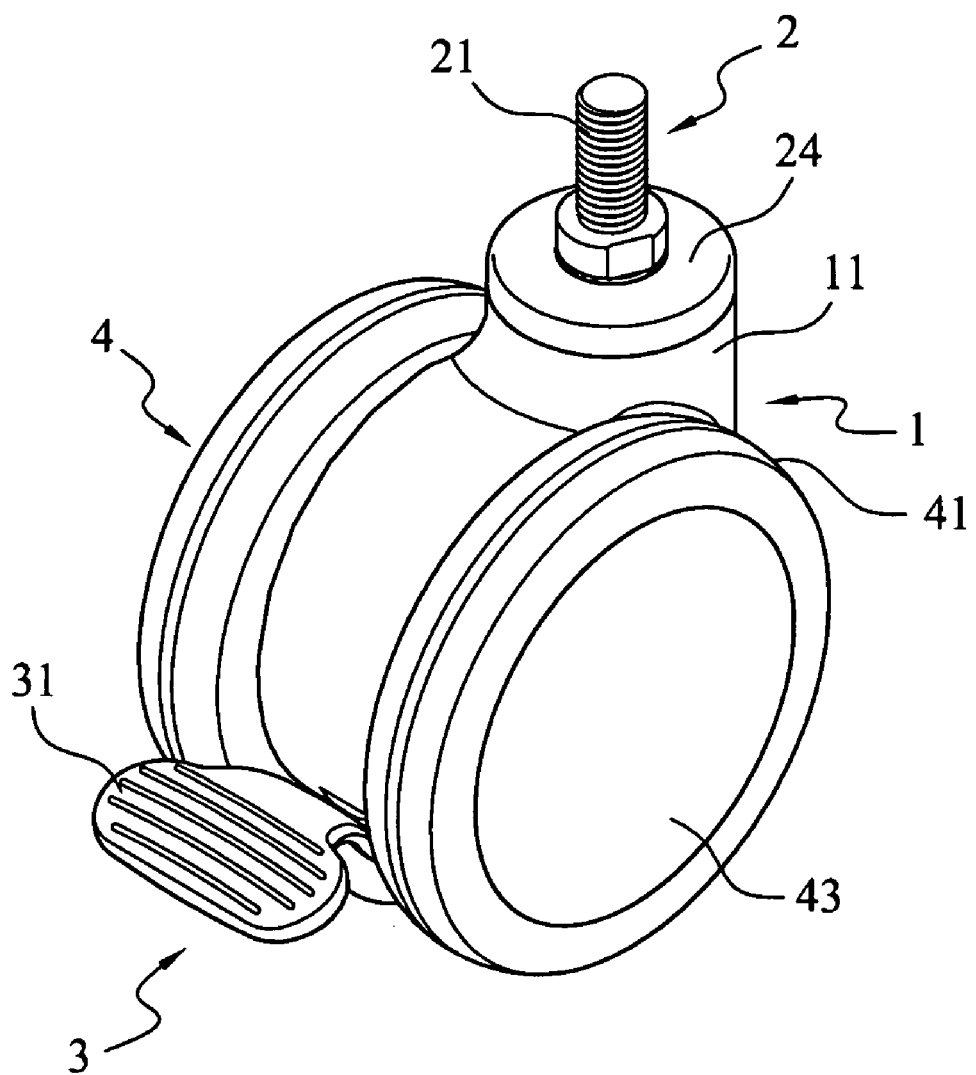
FIG. 1 is a perspective view of a truckle assembly according to the present invention.
Figure 2:
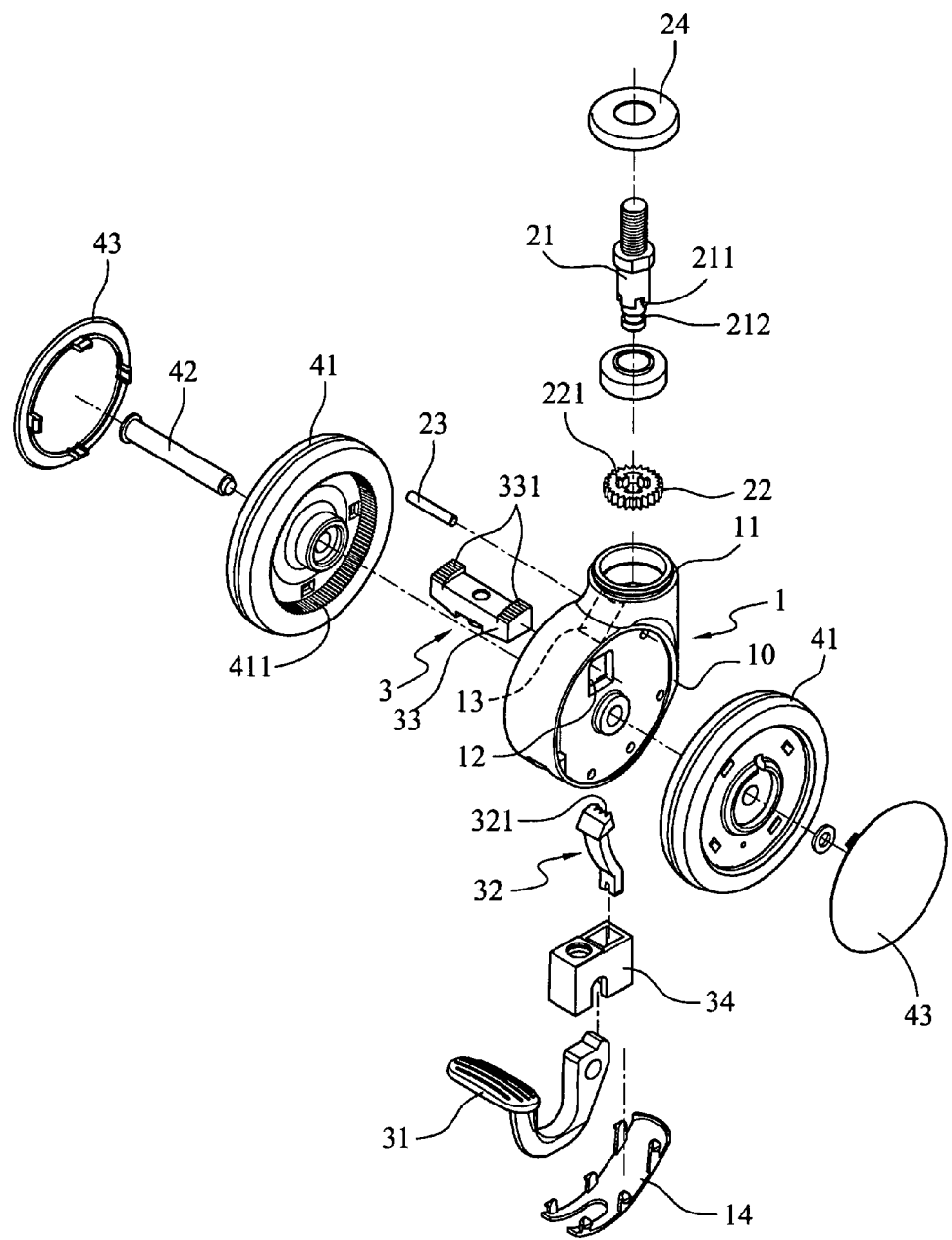
FIG. 2 is an exploded view of the truckle assembly of FIG. 1.
Figure 3:
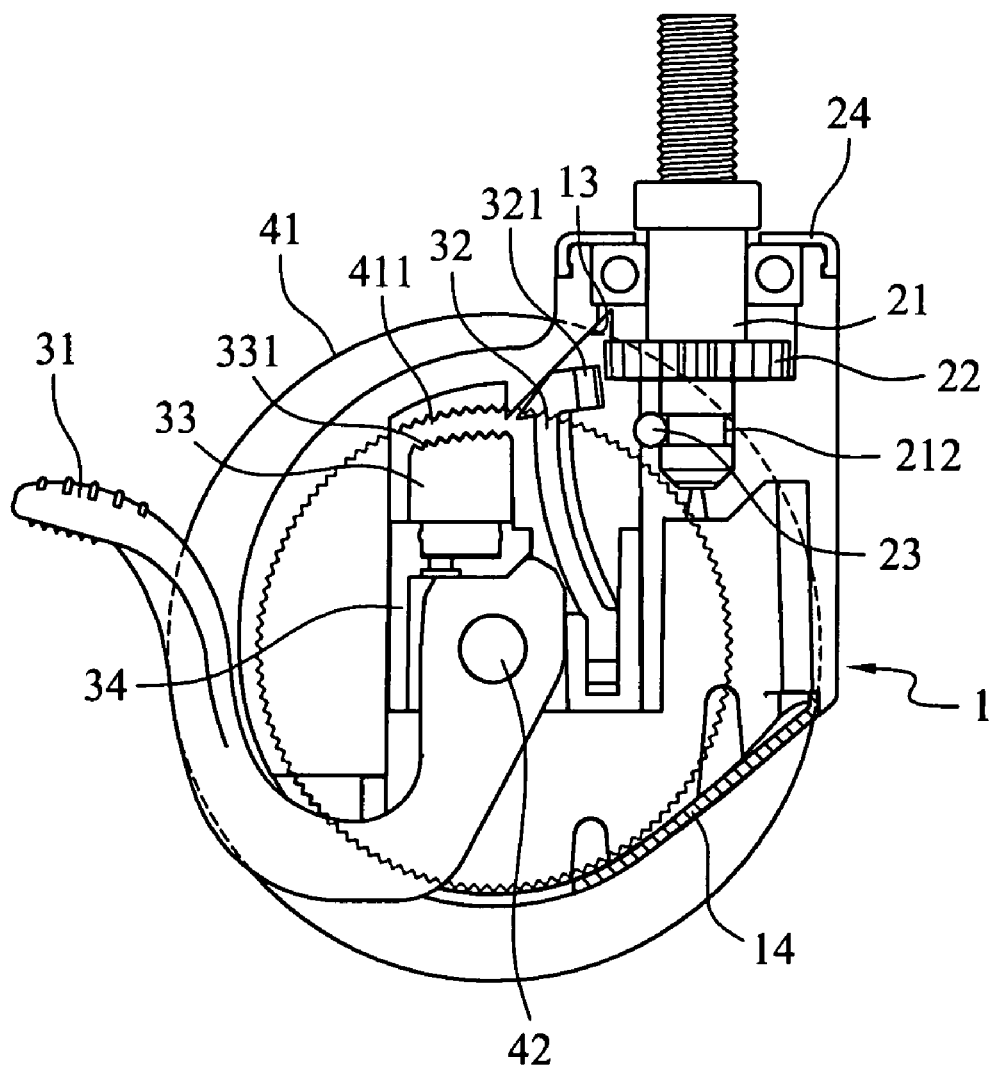
FIGS. 3 and 4 are side views of the truckle assembly, and wherein the truckle assembly is partially taken away for being clearly shown in use.

Referring to FIGS. 1, 2 and 3, a truckle assembly in accordance with the present invention comprises a housing 1, a rotating unit 2, a limiting unit 3 and a wheel assembly 4. The limiting unit 3 is able to limit movement and rotation directions of the truckle assembly simultaneously.

The housing 1 includes a body 10, and a sleeve 11 on an end of the body 10 and communicating with interior of the body 10. A through hole 12 is transversely defined through opposite sides of the body 10. A slope portion 13 with an angle of substantially 45° is formed inside the body 10 and neighboring the sleeve 11. A bottom cover 14 is provided on a bottom of the body 10.

The rotating unit 2 is movably mounted on the sleeve 11 of the housing 1, and includes a central shaft 21, and a gear ring 22 mounted on the central shaft 21 for corresponding to a first side (not labeled) of the slope portion 13. The central shaft 21 defines a plurality of cutouts 211, which are distributed around an appropriate position thereof. The gear ring 22 forms a plurality of ribs 221 along an inner edge thereof for embedding into the cutouts 211. A recess 212 is defined around an end of the central shaft 21, and a pin 23 extends through the housing 1 for cooperating with the recess 212 to limit the central shaft 21 in the sleeve 11. A closing cover 24 is mounted around the rotating unit 2 for enclosing the sleeve 11.

The limiting unit 3 includes a pedal 31, an interferential portion 32 linking an end of the pedal 31, and an arresting portion 33 linking an end of the interferential portion 32. The pedal 31 has a first portion (not labeled) extending into the housing 1, and a second portion (not labeled) extending out of the housing 1. A pushing block 34 is assembled on the first portion of the pedal 31, and the interferential portion 32 and the arresting portion 33 are assembled to the pushing block 34. The interferential portion 32 corresponds to a second side (not labeled) of the slope portion 13, and forms a meshing portion 321 adjacent the slope portion 13 in assembly. The arresting portion 33 has two sides respectively extending out of the through hole 12. The arresting portion 33 forms indented portions 331 on sides thereof.

The wheel assembly 4 comprises at least a wheel 41 assembled on sides of the housing 1, and a shaft pole 42 extending through the wheels 41 and the pedal 31. Each wheel 41 forms a toothed portion 411 on a side thereof and adjacent the housing 1 for corresponding to the indented portion 331 of the arresting portion 33. Side covers 43 are assembled to outward sides of the wheels 41 to protect the wheels 41.

Figure 4:
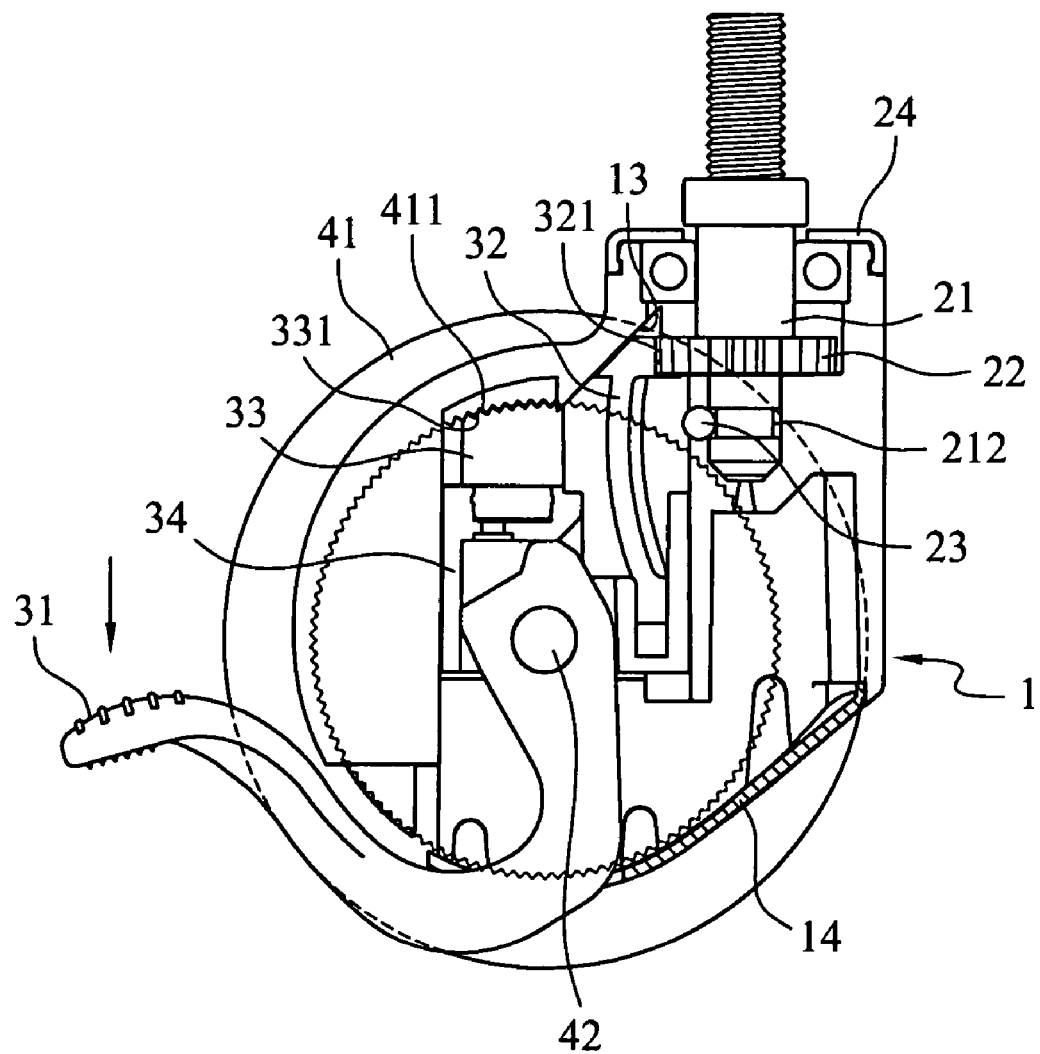

Referring to FIGS. 1, 3 and 4, in use, an object (not shown) is assembled on the central shaft 21 of the rotating unit 2. When an external force presses against the second portion of the pedal 31, the first portion of the pedal 31 is caused to move upwardly. The first portion of the pedal 31 pushes the pushing block 34 to move upwardly, and brings the interferential portion 32 and the arresting portion 33 to move upwardly. The interferential portion 32 moves along the slope portion 13 and toward the sleeve 11 until the meshing portion 321 of the interferential portion 32 meshes with the gear ring 22 of the rotating unit 2. Thus rotation of the rotating unit 2 is thus stopped. As the interferential portion 32 moves, the arresting portion 33 moves upwardly inside the through hole 12 of the housing 1. The indented portions 331 of the arresting portion 33 respectively mesh with the toothed portions 411 of the wheels 41. Movement of the wheel assembly 4 is thus limited. Generally speaking, rotation and movement of the truckle assembly is reliably stopped at a time when the pedal 31 is pressed.

It is understood that the invention may be embodied in other forms without departing from the spirit thereof. Thus, the present examples and embodiments are to be considered in all respects as illustrative and not restrictive, and the invention is not to be limited to the details given herein.

What is claimed is:

1. A truckle assembly comprising:
   a housing including a body, and a sleeve on an end of the body and communicating with interior of the body, a through hole being defined through opposite sides of the body, a slope portion defined to extend across an inward facing interior surface of the body and an inward facing interior surface of the sleeve;
   a rotating unit movably mounted on the sleeve of the housing, and including a central shaft, and a gear ring mounted on the central shaft for corresponding to the slope portion;
   a limiting unit including a pedal, an interferential portion linking an end of the pedal and having a meshing portion adjacent the slope portion, and an arresting portion linking an end of the interferential portion, the pedal having a first portion extending into the housing, and a second portion extending out of the housing, the interferential portion being positioned to contact and move upwards along the slope portion from an unlocked position towards the sleeve into a locked position to mesh the meshing portion with the gear ring, the arresting portion having two sides respectively extending out of the through hole of the housing; and a wheel assembly including at least a wheel assembled on sides of the housing, and a shaft pole extending through the at least a wheel and the pedal, each wheel forming a toothed portion adjacent the housing for corresponding to the arresting portion.

2. The truckle assembly as claimed in claim 1, wherein the slope portion forms an angle of substantially 45°.

3. The truckle assembly as claimed in claim 1, wherein a bottom cover is provided on a bottom of the body.

4. The truckle assembly as claimed in claim 1, wherein a closing cover is mounted around the rotating unit for enclosing the sleeve.

5. The truckle assembly as claimed in claim 1, wherein a recess is defined around an end of the central shaft, and a pin extends through the housing for cooperation with the recess.

6. The truckle assembly as claimed in 1, wherein the central shaft defined a plurality of cutouts around the central shaft, and wherein the gear ring forms a plurality of ribs along an inner edge thereof for embedding into the cutouts.

7. The truckle assembly as claimed in claim 1, wherein a pushing block is assembled on the first portion of the pedal, and the interferential portion and the arresting portion are assembled to the pushing block.

8. The truckle assembly as claimed in claim 1, wherein the arresting portion forms indented portions on sides thereof, and wherein the at least a wheel forms a toothed portion on a side thereof for corresponding to the indented portion.

9. The truckle assembly as claimed in claim 1, wherein a plurality of side covers are assembled to outward sides of the at least a wheel.

* * * * *